INVENTORS:
David Paul Gregg
Keith O. Johnson

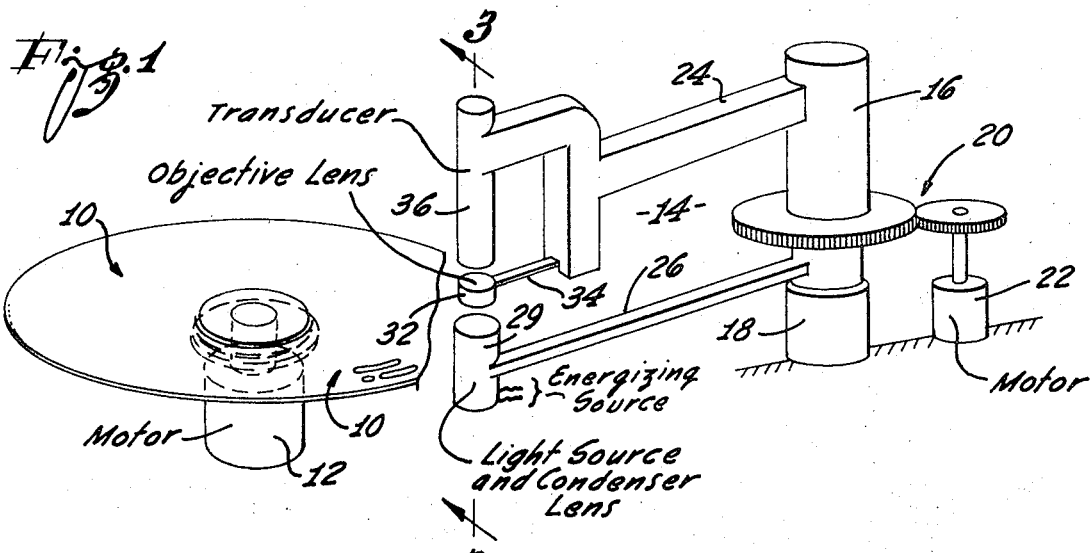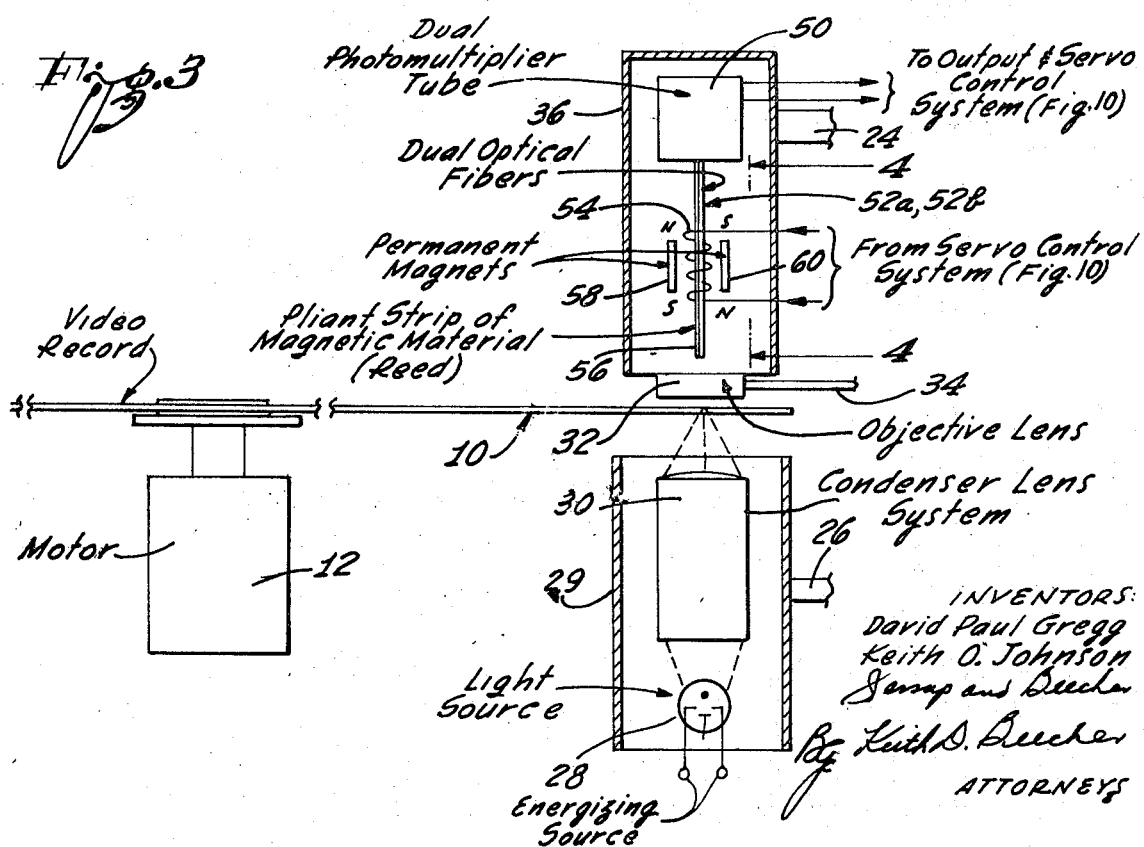

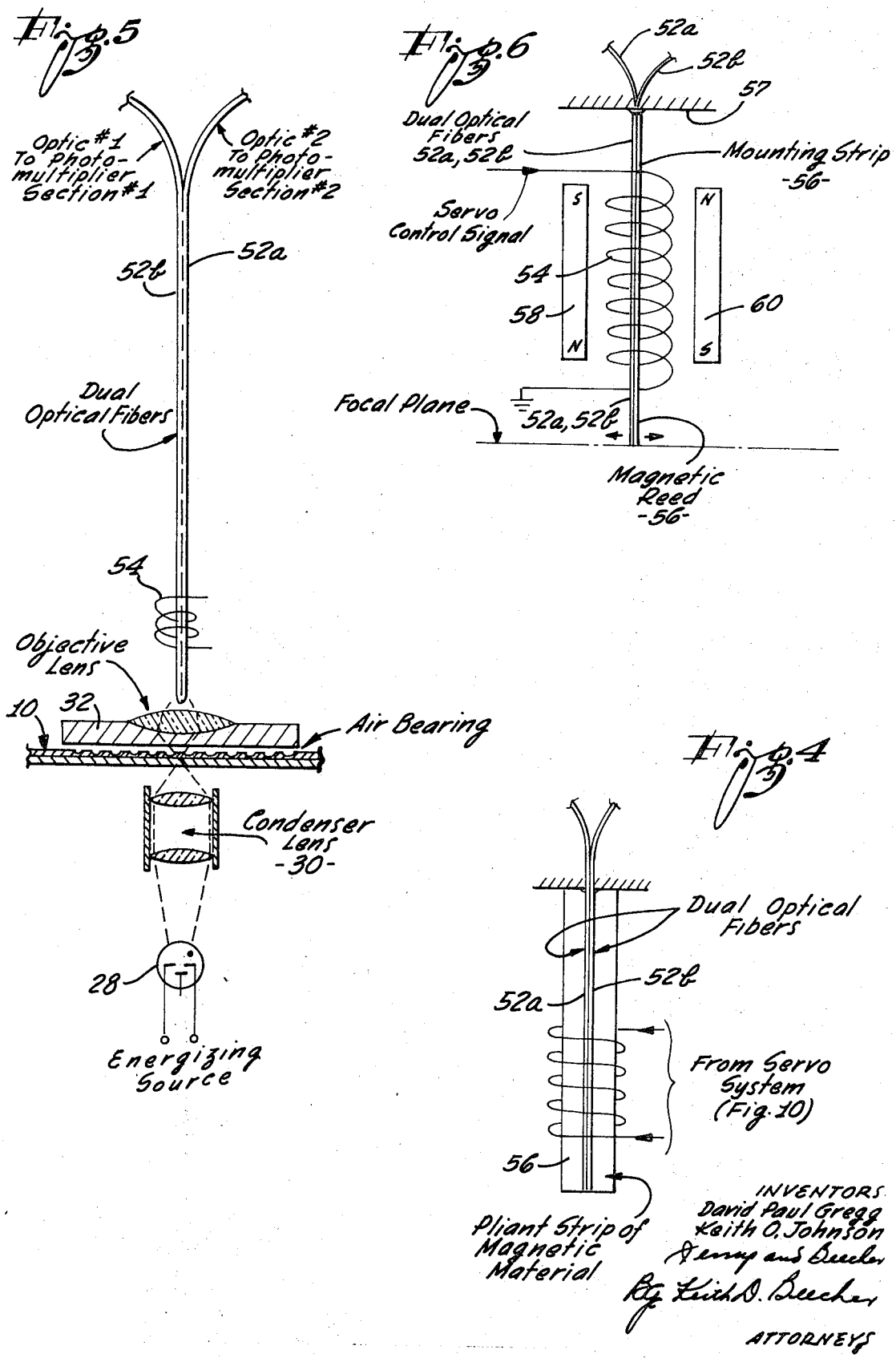

ATTORNEYS

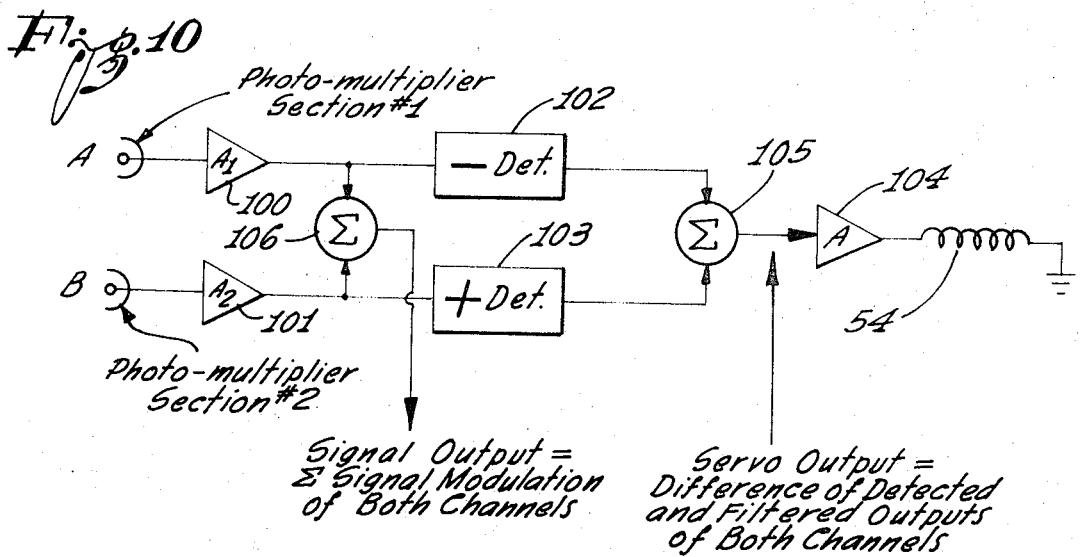
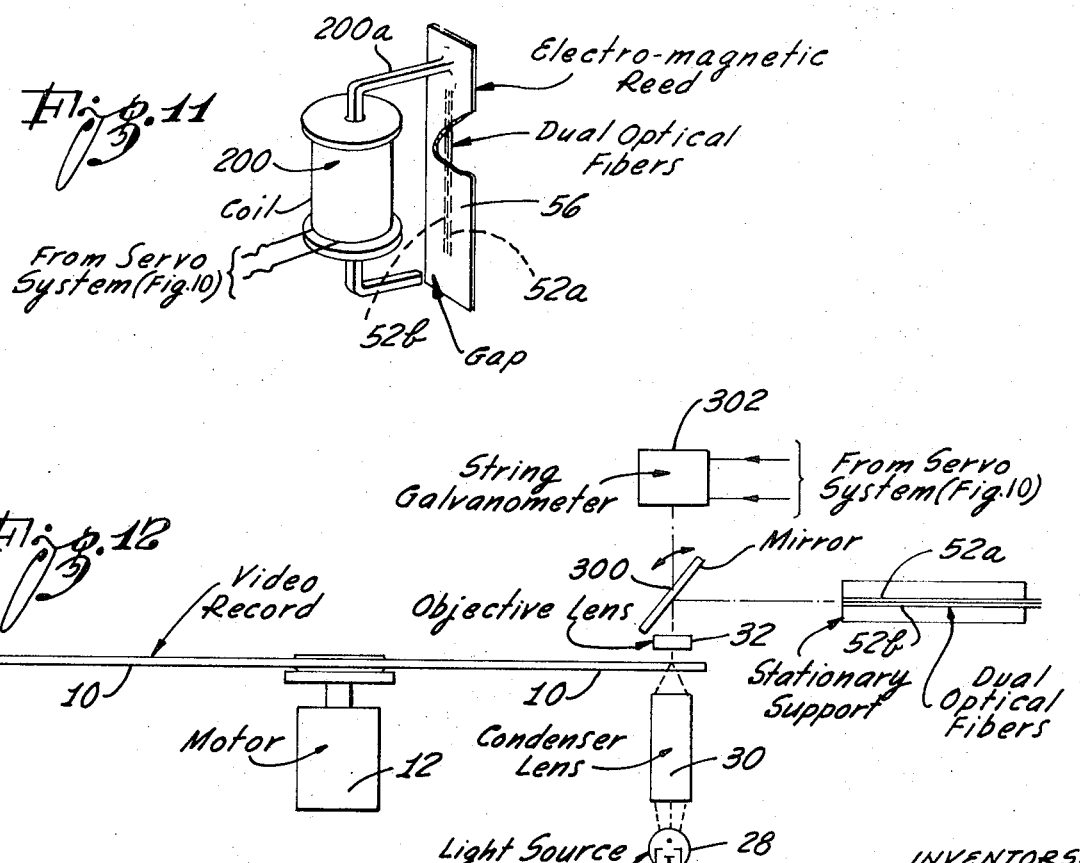

INVENTORS:
David Paul Gregg
Keith O. Johnson

By Keith D. Beecher

ATTORNEYS

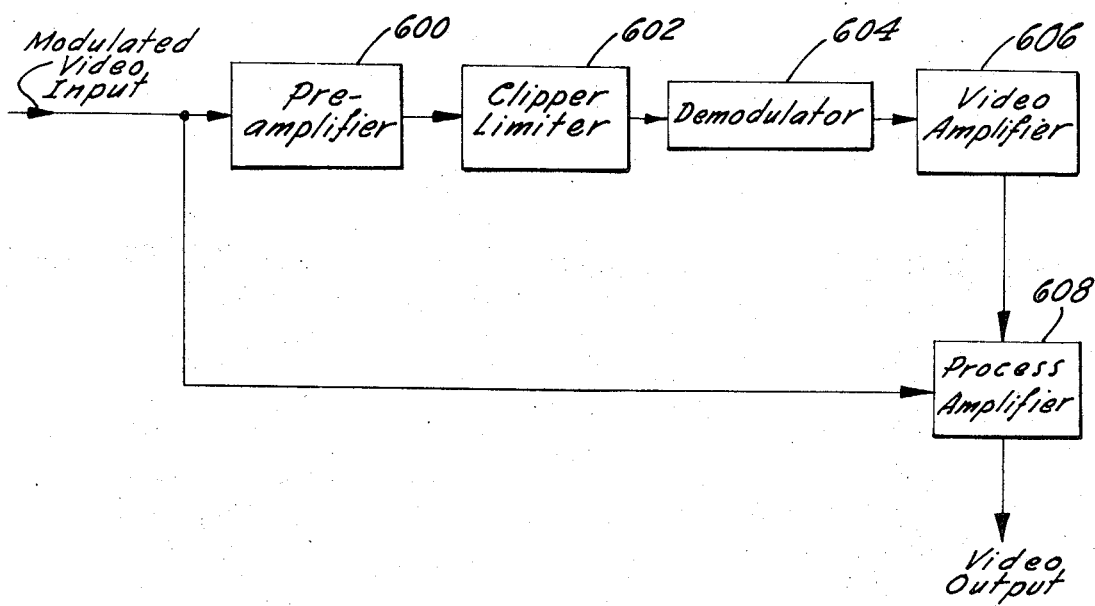
Fig. 17 (Video Signal Electronics)
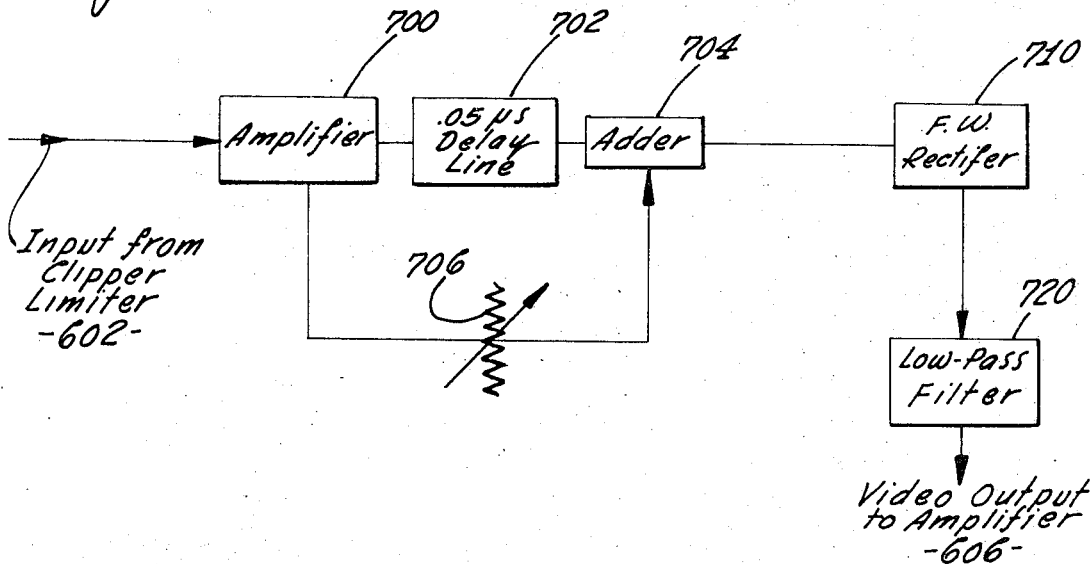
Fig. 18 (Demodulator Details)

United States Patent Office

3,530,258
Patented Sept. 22, 1970

3,530,258
VIDEO SIGNAL TRANSDUCER HAVING SERVO CONTROLLED FLEXIBLE FIBER OPTIC TRACK CENTERING
David Paul Gregg, Los Angeles, and Keith O. Johnson, Topanga Canyon, Calif., assignors, by mesne assignments, to MCA Technology, Inc., Santa Monica, Calif.
Continuation-in-part of application Ser. No. 507,474, Nov. 12, 1965. This application June 28, 1968, Ser. No. 741,020
Int. Cl. G11b 7/00; H04n 5/86, 1/24
U.S. Cl. 179—100.3               7 Claims

ABSTRACT OF THE DISCLOSURE

A video signal reproducer pick-up head is provided for deriving video signals from a track on an optical recording medium; the pick-up head includes a movable support which is suspended over the recording medium, and means on the support for sensing the video signals recorded on the medium, the transducer being capable of generating control signals which are applied to a servo control system which, in turn, controls the position of the support and thereby serves to maintain the sensing means in proper registry with the track on the recording medium.

RELATED COPENDING APPLICATIONS

The present application is a continuation-in-part of copending application Ser. No. 507,474, filed Nov. 12, 1965, now abandoned, in the names of the present inventors, and assigned to the present assignee.

BACKGROUND OF THE INVENTION

Systems have been developed for reproducing video signals which have been optically recorded on a disc, tape, or other medium. In such reproducing systems, a light beam is usually directed through the optical recording medium to a pick-up head. Then, as the recording medium is moved between the light beam and the pick-up head, the light beam is modulated in accordance with the video signals recorded on the medium, and the pick-up head responds to the modulated light beam to produce electrical video signals corresponding thereto.

The present invention is concerned with such a pick-up head, and more particularly with an improved pick-up head and associated control system which maintains the head in registry with the recording track on the medium, as the medium is moved between the head and the light source.

For example, in one embodiment of the invention, the improved pick-up head includes a pair of optical fibers, which are mounted beside one another with their ends adjacent the recording medium. The optical fibers respond to the modulations of the light directed through the recording track of the recording medium, so as to transmit the resulting modulated light signals to one or more photoelectric transducers mounted within the head. The resulting electrical output signals from the photoelectric transducers are applied to a usual video reproducing system to reconstruct the picture represented by the signals optically recorded on the recording medium. The electrical output signals from the transducers are also used, as will be described, in a servo system to control the position of the ends of the optical fibers which are adjacent the recording medium, so as to maintain the optical fibers in perfect registry with the recording track on the optical recording medium.

In another embodiment of the invention to be described, a photoelectric transducer element is positioned in the pick-up head to be directly adjacent the track of the recording medium, and a servo control serves to maintain the transducer in perfect registry with the recording track on the medium throughout the play-back process. Increased efficiency and sensitivity may be achieved by the latter embodiment, as compared with the previously described embodiment, because the photoelectric transducer element is positioned adjacent the plane of the recording medium, because it responds directly to the modulated light passing through the recording medium for precise servo control, and because the need for optical fibers is obviated.

In the latter embodiment, for example, a dual PIN photodiode may be mounted on the lower end of a support member, and may be held suspended thereby over the recording medium in position to receive the light beam directed through the medium. Then, as the medium is moved between the source of the light beam and the photodiode, the resulting modulations of the light beam are sensed by the photodiode, which produces corresponding video electrical signals.

The aforesaid PIN photodiode also produces a pair of 180° phase displaced signals which are equal in amplitude when the photodiode is correctly tracking the recording medium, but which change in relative amplitude when the photodiode tends to move out of registry with the corresponding recording track. The latter signals are used in an appropriate servo control system to control the position of the support member and maintain the photodiode in registry with the recording track throughout the play-back reproducing process.

In yet another embodiment of the invention to be described, a galvanometer controlled mirror is used to direct the modulated light beam from the recording medium to the photoelectric transducer means, and to maintain the light beam incident on the transducer means regardless of small discontinuities or eccentricities in the recording medium or in the play-back equipment.

BRIEF DESCRIPTION OF THE DRAWINGS

FIG. 1 is a perspective schematic representation of a video signal pick-up head which is capable of reproducing electrical video signals from optical recordings on a rotating video recording disc, and which may incorporate the concepts of the present invention;

FIG. 2 is an enlarged fragmentary representation of a video recording disc having optical recordings of a video signal in a spiral track thereon which extends from the outer to the inner limits of the disc;

FIG. 3 is a section of the pick-up head of FIG. 1, taken substantially along the line 3—3 of FIG. 1, and showing in somewhat schematic form the internal components of the pick-up head in the practice of one embodiment of the invention;

FIG. 4 is a fragmentary view of certain of the internal components of the pick-up head, as viewed, for example, essentially along the line 4—4 of FIG. 3;

FIG. 5 is a schematic representation of the pick-up head and associated components;

FIG. 6 is a schematic representation of a control element used in the pick-up head;

FIG. 10 is a block diagram of a further servo control system for use in conjunction with the pick-up head;

FIG. 11 is a fragmentary view showing a modified electro-mechanical control transducer which may be incorporated into the pick-up head to respond to signals from the servo system of FIG. 9;

FIG. 12 is a schematic representation of a modified form of the pick-up head, incorporating, for example, a mirror-type galvanometer in order effectively to maintain registry between the sensing means in the head and the recording track on the video recording disc;

FIGS. 17 and 18 are block diagrams of suitable video signal processing electronics for use with the pick-up head.

DETAILED DESCRIPTION OF THE ILLUSTRATED EMBODIMENTS

Figure 7:
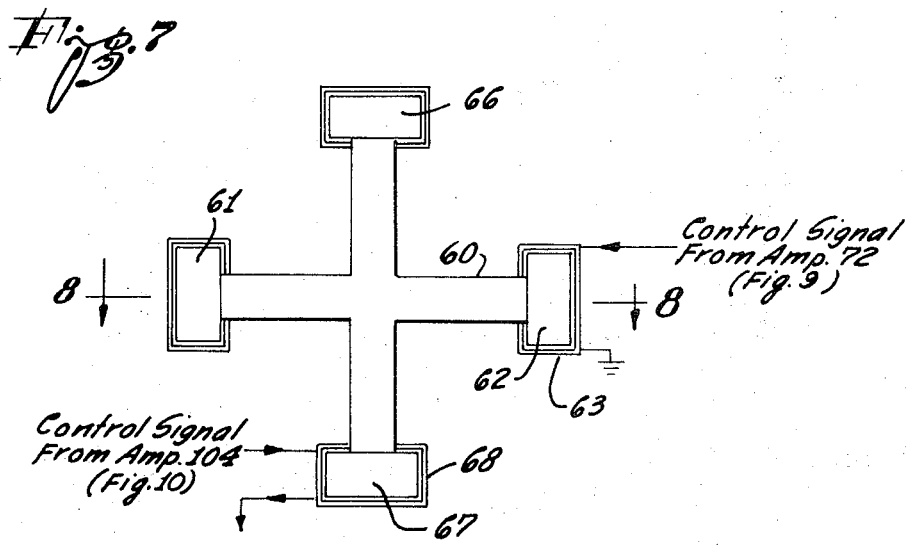
FIGS. 7 and 8 are respective plan and elevational views of another type of control element which may be used in the pick-up head.

The pick-up assembly and system to be described constitutes a unique approach to the problem of locking into a microscopically narrow spiral recording track on the recording disc, when that track and the information on it have very erratic paths with respect to their own dimensions. At any instant in time during the video reproduction process, a given bit of information in the recording track may be located some distance away from its ideal, or average, position. The rate at which the bit moves in all three axes may be unusually high, in some cases in the range of thousands of cycles per second.

The sources of positional error between the sensitive element of the pick-up head and the corresponding recordings on the disc are as follows:

(1) Turntable wobble and run-out at the rate of motor speed;
(2) Slight warpage of the disc itself;
(3) Imbalance of the disc;
(4) Turntable motor hum and magnetostriction;
(5) Miscellaneous sources including motor bearing rumble and noise, wind turbulence, etc.

When summed, the error signals from the sources 1, 2 and 3 are found to have a 30 Hz. fundamental and diminishing series of harmonics; the error signal from source 4 has been found to have a 120 Hz. fundamental and diminishing harmonic series; and the error signals from source 5 have been found to constitute random noise over a range up to several thousand Hz. Thus, the capacity of the pick-up assembly to track large error signal amplitudes or rates, is a major factor in simplifying the construction of the overall system, and of reducing its cost.

The apparatus shown in FIG. 1 includes a recording medium 10 in the form of a disc having video signals optically recorded thereon. The video signals are recorded on the disc 10 in a recording track which extends as a spiral from the outer periphery of the disc towards its center. The recording track on the disc 10 may have a width, for example, of the order of 1 micron, and the spacing between adjacent convolutions of the track may also be of the order of 1 micron. The video recording disc 10 is rotatably driven by an electric motor 12. The motor 12 may rotate the video recording disc at a relatively high speed, under normal conditions. For example, the disc may be rotated at speeds in the range of 900–3600 r.p.m., by the motor 12.

A pick-up assembly 14 is included in the apparatus in position such that its light-sensitive elements may travel along the spiral recording track on the disc 10. The pick-up 14 includes, for example, a post 16 which is rotatably mounted in a fixed tubular base 18. The post 16 may be rotatably driven around its longitudinal axis by an appropriate gear and pinion combination 20, or other suitable drive means, driven, for example, by a motor 22. A pair of spaced parallel upper and lower radial arms 24 and 26 extend out from the post 16. These arms are positioned such that the radial arm 24 passes over the plane of the rotating video recording disc 10, and the radial arm 26 passes under the plane of the rotating disc.

A light source in the form, for example, of a mercury vapor arc lamp 28 (FIG. 3) is supported at the end of the arm 26 in a suitable tubular housing 29. The mercury arc lamp source is advantageous since it provides high intensity in the blue light range, to which most photosensitive devices are most responsive. With such a source, however, it has been found more convenient to mount the lamp itself in the base 18 and transmit its light by mirrors along the arm 26 and into the housing 29. An appropriate condensing lens system 30 (FIG. 3) is also positioned in the housing 29, and the condensing lens system serves to focus the light from the light source 28 into a 1 millimeter nominal spot diameter on the bottom side of the recorded layer in the disc 10. It will become evident as the description proceeds that other types of radiation, other than visible light may be used. For example, the radiation may consist of photons, ultra-violet rays, X-rays, infra-red rays, or any other appropriate radiation.

For the reasons indicated above, a mercury arc lamp for the light source 28 is advantageous. Other advantages are low cost, long life, high efficiency in the blue light region which is desired. Since the mercury arc lamps have a relatively high green-yellow emission in the present-day market, a light filter may be required. This filter should have peak transmission in the desired blue range and maximum attenuation at all other wavelengths. A practical compromise is the use of an appropriate glass, such as CG585, whose losses over the blue-violet range are 10–16%, but whose losses are about 90% in the unwanted green-yellow range. A light reflector may also be used in conjunction with the light source 28, in order to increase the solid geometric angle of the light gathering from the arc tube of the mercury lamp. The infra-red energy should be free to pass through the reflector to be dissipated by any suitable means. The reflector, for example, may be an infra-red transparent glass or plastic mounting. The reflector shape should tend to compensate for the length of the mercury arc, as opposed to the ideal point source. A reflector coating excellent for reflectivity in the blue-violet range, but transparent to infra-red, is magnesium oxide, with a ratio of about .98/.025.

As the motor 12 rotates the video recording disc 10, a modulated light signal will appear at the upper side of the disc representing the video information recorded on the disc. An objective lens subassembly 32 is supported on the ends of a flexible coupling compliant drag link 34 which, in turn, is affixed to the end of the arm 24. The lens 32 is optically aligned with the condensing lens 30, so that the modulated light signal from the record 10 passes through the objective lens. The coupling 34 may be in the form of a strap, and is flexible in a direction perpendicular to the plane of the record 10, so that the objective lens 32 may move back and forth in the aforesaid perpendicular direction. The objective lens subassembly 32 rides on a film of air in close proximity with the upper surface of the video recording disc 10, and it moves up and down in response to irregularities in the upper surface of the disc. This subassembly compensates for bit displacements in the Z-axis, normal to the ideal plane of the disc 10.

The aforesaid Z-axis compensation is accomplished by holding the distance between the objective lens sub-assembly 32 and the recorded layer of the disc 10 relatively constant. The illustrated means develops a Bernoulli film, or air bearing, between the lens holder and the top of the disc surface. The resulting fluid film is of unusually constant thickness, within hundreds of angstroms. It is important that the Z-axis motion of the objective lens sub-assembly 30 with respect to the light sensitive element of the pick-up assembly should not exceed the depth of field of the lens which is of the order of 1.23 microns. The objective lens sub-assembly 32 is preferably blueviolet corrected, and is of light weight with an aerodynamically designed holder. The lens sub-assembly 32 is is retained in proper position by the compliant drag link 34. The objective lens sub-assembly may be a glass microscope objective lens, and the lens may be made of molded plastic. As alternatives, Fresnel lenses or zone plates may be used.

A transducer 36 is also supported on the end of the arm 24 in optical alignment with the objective lens sub-assembly 32. The objective lens sub-assembly 32 directs the light signals from the modulated layer of the of the disc 10 to the sensitive elements of the transducer 36. The transducer 36, as will be described, responds to the aforesaid light signals to produce output electrical signals corresponding to the video information recorded on the disc 10; and it also responds to the aforesaid light signals to produce output signals which are used for servo control purposes, as will be described.

As shown in FIG. 3, the transducer 36 may include a photomultiplier tube 50, or other suitable radiation detector. This photo-multiplier tube may be of the type described in U.S. Pat. No. 3,349,273, which issued Oct. 24, 1967 in the name of David Paul Gregg. However, any other suitable photodiode, such as the PIN avalanche type multiplication diode may be used. The transducer also a pair of optical fiber members 52a and 52b, or other appropriate radiation guides, which are attached to one another and which are suspended from the photomultiplier tube 50 adjacent one another, on a pliant magnetic reed member 56. The optical fibers 52a and 52b serve to translate the modulate light signals received from the objective lens 32 to the sensitive elements of the photo-multiplier tube 50.

The optical fibers 52a and 52b may be attached to the magnetic reed 56 by any appropriate adhesive. Under some circumstances it might be desirable to eliminate the magnetic reed 56 in order to reduce the mass, and to plate the optical fibers with a high magnetic coercivity material such as cobalt. Moreover, the optical fibers may be replaced, for example, by transparent deposits on the magnetic reed, or other substrate. These deposits may be, for example, formed of thin lines of magnesium oxide extending as independent spaced-apart light guides, of transmission lines, along the length of the reed. The light guides may be clad, for example, with a suitable substance such as silicon dioxide, whose index of refraction is greater than that of the guides. In this manner, the light incident on the lower end of the light guides is transmitted thereby to the photomultiplier tube 50 at the upper end, and which may be formed integrally therewith. An advantage of this latter type of structure is that the resulting transmission lines may be formed easier than the mounting of the optical fibers since there is no need to handle microminiature components.

Fiber optic theory is well covered in the literature. For the purposes of the present invention, the optical fibers are drawn and cut from a rod which has been concentrically cladded. There are three variables which must be considered: light wavelength accommodated; the ratio of cladding thickness to core diameter; and the ratio of indices of refraction of the cladding and core glasses. When properly chosen for the specified color, the fiber has virtually total internal reflection and minimum practical numerical aperture. High internal reflection tends to reduce the light transmission loss through the fiber, although this loss is relatively insignificant compared with others in the overall system. More importantly, high reflection helps to minimize the optical cross-talk between the two closely adjacent fibers 52a and 52b in the assembly. The low numerical aperture permits the end of each optical fiber 52a and 52b to "see" only what it is in front of it; otherwise each fiber would cross-talk with the other by "seeing" adjacent track images. Numerical apertures approaching 0.10 apparently are attainable.

A suggested specimen for the optical fibers are as follows: 2 micrometers outer diameter ±10%; 0.4 micrometer coating thickness; numerical aperture 0.4 maximum; maximum transmission at 0.4 micrometer; minimum length 5 centimeters before assembly.

Methods for making very fine optical fibers, working them, and joining them to other glass objects, such as photocells, are described, for example, in Strong's Procedures in Experimental Physics, 1938.

As mentioned above, the objective lens sub-assembly 32 focuses the modulated light signals at the lower end of the optical fiber members, and the light signals are then carried by the optical fiber members 52a and 52b to the photo-multiplier tube 50. The photo-multiplier tube acts as a photoelectric transducer, and it produces corresponding electrical video signals in response to the modulated light signals. As described in the aforesaid patent, the photomultiplier tube 50 is a dual type, and it includes two independent portions which respond respectively to the light signals from the optical fibers 52a and 52b to produce independent video electrical output signals.

The dual photo-multiplier tube 50 may, of course, be replaced by two separate photo-multiplier tubes, or other type of photosensitive device. The function of the two sections of the photo-multiplier tube 50, or of the two separate photosensitive devices, is to convert pulses of light detected by the optical fibers 52a and 52b into two independent series of electrical pulses, with usual signal/noise ratio. A typical commercially available photocell applicable to the technical requirements of the system is the RCA 931A photo-multiplier, two of which would be required. This device, for example, has the following specifications:

Radiant sensitivity 0.24 a./μw.
Equivalent noise input (at 10 mHz.): 1.6 pw.
Equivalent anode dark current 2.5 pw.

For 60 db signal/noise ratio (volts), the equivalent signal-to-noise ratio (power) is 30 db. This means that the incoming radiant power of a pulse of light should be of the order of thirty-two times the worst conditions, or about 100 pw. Such a level of light intensity can be provided with currently available mercury vapor lamps serving as the light source 28, after all predictable system losses are subtracted.

In the pick-up assembly shown in FIGS. 3, 4 and 6, the optical fibers 52a and 52b are mounted on a thin pliant magnetic reed member 56, as mentioned above, and which may be a ferromagnetic leaf of the type presently used in magnetic reed switches but of much thinner dimensions. After the optical fibers 52a and 52b are cemented to the magnetic reed 56, the light gathering lower ends of the optical fibers are lapped square and relatively smooth. The upper ends of the fibers are spread apart and joined independently to the faces of the two sections of the photo-multiplier tube 50.

The magnetic reed 56 is suspended from the lower end of the photo-multiplier tube 50 with the optical fibers 52a and 52b within the coil 54, and a pair of permanent magnets 58 and 60 are positioned on opposite sides of the coil. These magnets are longitudinally magnetized in opposite directions, as shown, so that when currents are passed through the coil 54, the resulting magnetizing effect of the reed 56 causes the optical fibers 52a and 52b to be deflected along the rho-axis to the right or left in FIG. 3, depending upon the polarity of a servo control current applied to a coil 54 in the transducer 36, which effectively controls the radial position of the lower end of the optical fibers 52a and 52b with respect to the recording track on the disc 10.

The pick-up head assembly is shown in more detail in the schematic representation of FIG. 5. As shown in FIG. 5, the optical fiber elements, in the form of the two independent optical fibers 52a and 52b, are mounted adjacent one another and affixed to one another to form a flexible optical pick-up member. These members, as mentioned above, may be mounted on a pliant magnetic reed, for example, as designated 56 in FIG. 4. The upper ends of the two optical fibers 52a and 52b are optically coupled to different sections of the dual photo-multiplier 50, and the photo-multiplier produces two independent output electrical video signals respectively corresponding to the light signals translated by the two optical fibers 52a and 52b.

As shown in FIG. 5, the optical fibers 52a and 52b both respond to the modulated light beam from the recording track on the disc 10. The two optical fibers 52a and 52b are disposed in side-by-side relationship, so that they extend in transverse relation with the spiral recording track on the disc 10 of FIG. 2. It will be appreciated that so long as both the optical fibers 52a and 52b are within the confines of the recording track, the mean signal output from the two photo-multiplier sections will be the same. However, whenever there is a tendency for the pick-up head to shift so that one of the optical fibers is disposed outside the confines of the recording track, the mean signal amplitude from the two photo-multiplier sections will be different.

The aforesaid radial compensation produced on the optical fibers 52a and 52b by the servo signal in the coil 54 will be referred to as the rho-axis compensation. The rho-axis is essentially tangential to the arc swept by the pick-up arm 14 as ito progresses across the surface of the disc 10 of FIG. 2. For all practical purposes, the rho-axis is a given stationary radius on the disc.

Referring to FIG. 6, and assuming a rho-axis tracking error compensation of 1 millimeter, for example, and a 2:1 magnification by the objective lens sub-assembly 32, then a circular image plane of about 2 millimeters in diameter is presented in the designated focal plane to the ends of the optical fibers 52a and 52b. Each optical fiber 52a and 52b may, for example, have a diameter of 2 microns, and the pair of optical fibers may be positioned closely and parallel to one another such that the center-to-center distance therebetween is also 2 microns. The plane of the center lines of the fibers is rotated until it coincides with the rho-axis. As mentioned, the optical fibers are mounted, for example, on the magnetic reed 56 so that their lower ends are free to swing back and forth along the rho-axis. Since the length of the optical fibers is much longer than the arc of swinging along the rho-axis, the said arc is a straight line for all practical purposes.

With the pick-up assembly operating, if at any instant in time the ends of the optical fibers 52a, 52b coincide symmetrically with the image of the track on the disc 10, the amount of light conducted through each optical fiber will be the same. Now, if the image of the recorded track starts to move in either direction along the rho-axis, the light detected by the optical fiber pair 52a, 52b becomes slightly unbalanced. Furthermore, the polarity of the unbalance conforms with the direction of relative track motion.

The aforesaid control serves the maintain the sensing elements in the transducer 36 in registry with the spiral recording track of the disc 10 of FIG. 2, as the pick-up effectively moves along the track. It will be appreciated, of course, that the motor 22 in FIG. 1 causes the arms 24 and 26 to swing slowly across the disc 10, as the disc rotates, so that the pick-up is caused effectively to follow the spiral recording track on the disc. While this tracking is taking place, the servo control system to be described provides the aforesaid rho-axis compensation to maintain the radial position of the optical fibers 52a and 52b in registry with the recording track.

Figure 8:
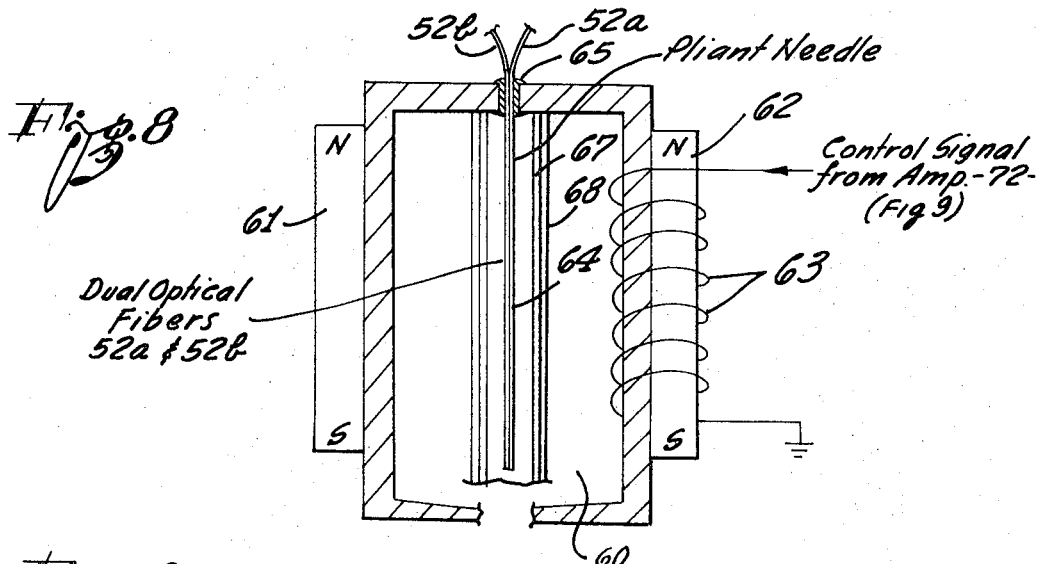

As described above, the pick-up of FIGS. 3, 4, 5 and 6 has a rho-axis compensation for the lower ends of the optical fibers 52a and 52b, so that they may properly track the groove of the disc 10 of FIGS. 1 and 2. Another possible instrumentality is shown in FIGS. 7 and 8. The latter instrumentality has the advantage of exerting a servo control on the optical fibers, not only along the aforesaid rho-axis, but also to provide a theta-axis compensation which extends tangentially with respect to the recording track.

Compared with the various forms of magnetic video tape, the system of the present invention has a high inertia in the disc and low inertia in the pick-up. In magnetic video tape, the opposite tends to hold true unless expensive electrical delay lines or sophisticated mechanical means are used. For this reason, inter alia, there is no currently available magnetic video tape machine on the market with true color video capability, except for those selling at extremely high prices. The inherent characteristics of the system of the invention render it suitable for color television recording. However, the system does have some time displacement error (TDE) which, if uncompensated, could degrade the color performance in some instances. The assembly shown in FIGS. 7 and 8 provides a theta-axis compensation for the time displacement error, and is important in the case of color television reproduction.

In the practice of the embodiment shown in FIGS. 7 and 8, a clock signal is provided on the record 10 of FIG. 2 which has a constant repetition frequency under ideal conditions, but which exhibits a varying frequency in the presence of time displacement errors. The clock signal may be obtained, for example, by recording the video signals on the record in the form of pulse duration modulations, and by using the leading edge of each pulse to derive the clock signal, all in accordance with known electronic techniques. In the embodiment of FIGS. 7 and 8, a housing 60 formed of a magnetic material and having the configuration shown in FIGS. 7 and 8 is provided. This housing is intended to be fitted to the underside of the photo-multiplier 50 of FIG. 3, and it has a central aperture through which the upper ends of the optical fibers 52a and 52b extend.

An elongated permanent magnet 61 is attached to one side of the housing 60, and a second elongated permanent magnet 62 is attached to the opposite side. These permanent magnets may each be magnetized to exhibit a north pole at the upper end and a south pole at the lower end, as shown. A coil 63 may be wound about the permanent magnet 62 and adjacent the side of the housing 60. It will be observed that the lower ends of the housing 60 define pole tips. The magnetic field at these pole tips is controlled by the current through the coil 63.

In the embodiment of FIGS. 7 and 8, the optical fibers 52a and 52b are attached to a needle 64 composed of magnetic material. The needle is suspended through the aforesaid hole in the housing 60 by means, for example, of a pliant cement 65. The needle itself may also be pliant, so that its lower end, and the lower ends of the optical fibers 52a and 52b are freely movable in both the radial (rho-axis) and tangential (theta-axis) directions with respect to the surface of the record 10.

A further pair of elongated permanent magnets 66 and 67 are attached to the remaining sides of the housing 60. A coil 68 is wound around the magnet 67 and the adjacent side of the housing 60. It will be understood that the magnets 66 and 67 may be similar in shape and magnetization to the magnets 61 and 62; and that the coil 68 may be wound in a manner similar to the coil 63.

Figure 9:
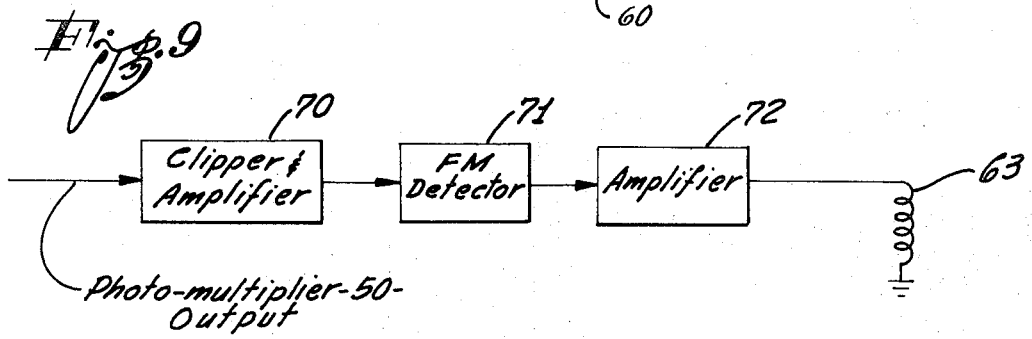
FIG. 9 is a block diagram of an appropriate electrical output circuit for use in conjunction with the pick-up head.
Figure 16:
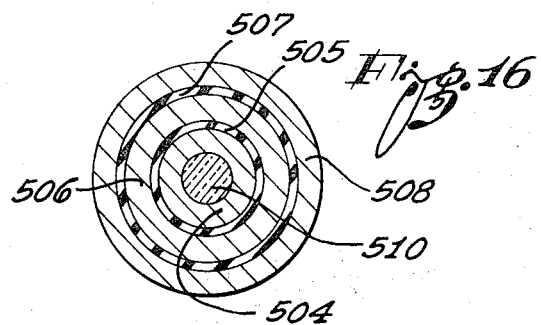

The coil 68 is assumed to respond to the signal from the servo control system of FIG. 9 to control the radial (rho-axis) displacement of the lower end of the needle 64 and attached optical fibers 52a and 52b. The coil 63, on the other hand, is assumed to respond to a signal from the control system of FIG. 16 to control the tangential (theta-axis) displacement of the lower end of the needle 64. In either event, the lower end of the needle is controlled due to the fixed magnetic fields from the pole tips corresponding, for example, to the permanent magnets 61 and 62; and to the varying magnetic fields from the other pole tips, as controlled by the signal currents in the coils 63 and 68.

In a manner similar to that described above, the current in the coil 68 is such that the radial displacement of the needle 64 along the rho-axis is controlled to maintain the optical fibers 52a and 52b centered over the recording track of the disc 10. The current in the coil 63, however, varies as the clock fequency varies. This latter variation causes the needle to move tangentially along the theta-axis either in the direction of movement of the record in the opposite direction so as to compensate for the time displacement errors exhibited by such variations in frequency of the clock frequency.

When the intelligence recorded in the recording track of the disc 10 is in the form of a pulse width modulation, for example, and when the output signal from the photomultiplier 50 is applied to the clipper and amplifier 70 of FIG. 9, a series of pulses is derived from the block 70. These pulses have a fixed repetition frequency, except when time displacement errors cause that frequency to vary. The aforesaid pulses are derived by differentiating the pulse modulated signal, and clipping the resulting pulses so that only the leading edge pulses are amplified in the unit 70 and passed to the output. The output pulses from the unit 70 are then applied to any suitable frequency detector 71. The detector 71 produces an error signal which has an amplitude and polarity which is a function of the variations in frequency in the output pulses with respect to a selected center frequency. The error signal from the detector 71 is amplified in an amplifier 72 and applied to the coil 63 (FIGS. 7 and 8), to control the theta-axis deflection of the needle 64.

As shown in FIG. 10, the dual photo-multiplier tube 50 has two sections A and B whose outputs are applied to respective amplifiers 100 and 101. The outputs of the amplifiers 100 and 101 are summed in a summing network 106. The output from the summing network represents the sum signal from the two photomultiplier sections and constitutes the modulated signal output of the transducer.

The signal amplitude from the first photomultiplier section is detected in a detector 102, and this detector produces a negative unidirectional signal representative thereof. The signal amplitude from the second photomultiplier section is detected in a detector 103, and the latter detector produces a negative unidirectional signal in response thereto. The two signals are added algebraically in a summing network 105 which produces an error signal.

The resulting error signal is amplified in an amplifier 104, and it is applied to the electromechanical transducer formed by the coil 54 of FIG. 5 (and by the coil 68 of FIG. 7). The error signal applied to the coil 54 causes the optical fiber elements 52a and 52b to shift in a radial direction along the rho-axis with respect to the disc 10, as explained above. The direction and amount of the shift depends on the polarity and amplitude of the error signal, so as to maintain the lower ends of the optical fiber elements 52a and 52b in perfect registry with the recording track on the record 10.

The output signal from the summing network 106 is applied to appropriate video detection and reproducing circuitry. It will be appreciated that the circuitry involved in the individual blocks shown in the system of FIGS. 9 and 10 is of itself extremely well known to the art, and a detailed showing and description of the circuitry is believed to be unnecessary.

In FIG. 10, the DC component of the output of the amplifier 104, when properly processed, may be used in several ways to move the pick-up arm of FIG. 1 across the disc 10 at very nearly the rate which makes the signal approach zero. One method is to integrate this component over short intervals until it reaches a predetermined value, at which it triggers a solenoid. This solenoid, in turn, actuates a light duty friction ratchet which then turns the pick-up arm through a very small angle. Another method, is to use an inexpensive electric clock movement with reduction gear, such as shown by the motor 22 in FIG. 1 to drive the arm continuously across the disc at a rate just slightly above 2 micrometers each $\frac{1}{30}$ second. In this case, the integrated signal of the first method is used to interrupt the motor voltage occasionally. To assist the process, the arms 24 and 26 of FIG. 1 may be biased slightly towards the center of the disc 10.

In the embodiment of FIG. 11, the coil 54 and permanent magnets 58 and 60 are replaced, for example, by an electro-magnetic transducer 200 which includes a U-shaped magnetic core 200a, with the reed 56 extending across the ends of the core 200a as a resilient magnetic leaf with its lower end spring biased away from the end of the core, as shown. The control signal from the servo system of FIG. 10 is applied to the coil of the transducer 200 to vary a D.C. bias current through the coil. Variations in the servo control signal cause the D.C. bias current to vary which, in turn, causes the end of the reed 56 to move towards and away from the corresponding end of the core 200a, providing the desired control on the reed 56, so as to maintain the lower ends of the optical fibers 52a and 52b in registry with the recording track on the disc 10.

In the embodiment of FIG. 12, the optical fibers 52a and 52b and the reed 56 are held stationary, and the modulated light beam from the objective lens 32 is directed to the lower end of the optical fibers by means of a mirror 300. The mirror 300 is controlled by a galvanometer 302, so as to constitute a usual mirror-type string galvanometer. The string galvanometer, in turn, is controlled by the control signal from the servo system of FIG. 10, so that the mirror 300 is caused to maintain the modulated light beam from the recording track of the disc 10 in registry with the ends of the optical fibers. Other controllable drives for the mirror 300 may, of course, be used.

Figure 13:
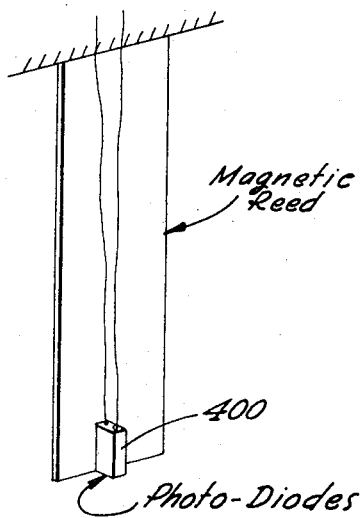
FIG. 13 is a fragmentary view of certain internal components of the pick-up head of FIG. 1, showing a further modification, in which a photodiode is suspended adjacent the video recording disc.

In yet another embodiment, and as shown in FIG. 13, for example, a dual photodiode, as indicated 400, may be mounted on the lower end of the pliant magnetic reed 56 directly adjacent the objective lens 32 (not shown). In this embodiment, the modulated light beam from the objective lens 32 is focused on the sensitive elements of the dual photodiode 400, so that the need of the optical fibers 52a, 52b is obviated. The photodiode 400, like the photo-multiplier tube 50, produces a pair of output signals which are also used for the servo control. The photodiode 400 may be of the PIN type, as will be described in more detail in conjunction with FIG. 14.

Silicon planar PIN photodiodes are known which may be used for the detection of light in the visible and near infra-red regions. Response to blue and violet light is unusually good for a very low dark current silicon photodiode. Therefore, when the light source used in the system is of the blue-violet type, the response by the PIN photodiode is extremely sensitive. PIN photodiodes, for example, are available from H. P. Associates of Palo Alto, Calif., which is an affiliate of the Hewlitt Packard Company.

Figure 14:
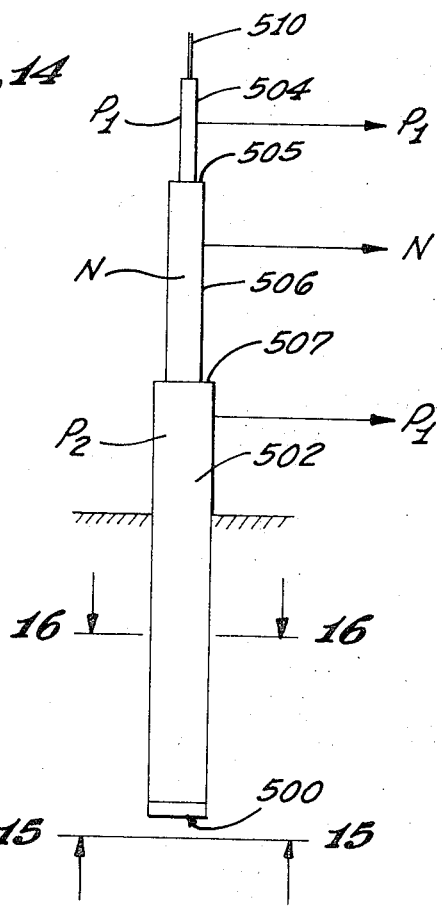
FIG. 14 is another fragmentary view of the internal components of the pick-up head, showing yet another embodiment of the pick-up head.
Figure 15:
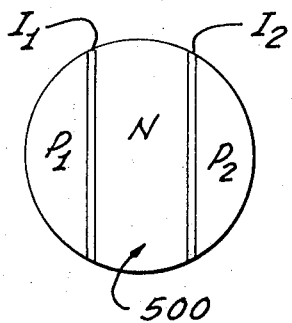
FIGS. 15 and 16 are cross-sectional views taken along the lines 15—15 and 16—16 of FIG. 14.

As shown in the embodiment of FIG. 14, for example, a pair of PIN photodiodes, designated 500 may be fabricated directly on the lower end of a rod 502. The rod 502 may be flexible in nature, and may, for example, have a diameter of the order of 1–2 microns. The PIN photodiodes may be fabricated in the manner shown in FIG. 11 to exhibit a common negative portion (N) at the center, with positive portions P1 and P2 at each side, separated by intrinsic portions I1 and I2. Appropriate connections may be made to the P1, N and P2 sections by concentric tubular connectors 504, 506 and 508 on the rod 502. The tubular concentric connectors are insulated from one another. Appropriate magnetic material may be included in the rod 502, so that the rod may be subjected to servo control in the same manner as the magnetic reed 56 in FIGS. 3, 4 and 6, for example.

The concentric tubular connectors on the rod 502 may be formed, for example, by first providing a one-quarter micron glass fiber core 510. Then, the P1 tubular conductor 504 may be plated or otherwise deposited as an electrical conductive coating on the glass fiber core. A magnetic material may be deposited over the tubular conductor 504, for the reasons expressed above. Then, a thin tubular insulating film 505 of, for example, silicon dioxide may be deposited over the tubular conductor 504, and a second tubular conductor 506 forming the common N connection may then be deposited. A second tubular insulating film 507 may then be formed over the tubular connector 506, and a final tubular connector 508 for the P2 connection may be deposited over the second insulating film 507. As mentioned, tubular magnetic members may also be deposited on the rod 502, so as to provide the necessary material for appropriate servo effects. The upper end of the rod 502 may be selectively etched, as shown, so that the appropriate P1, N and P2 connections may be made to the corresponding tubular connectors 504, 506, 508.

The PIN double diode 500 may then be formed on the lower end, with appropriate connections being made between the tubular connectors 504, 506, 508 and the corresponding P1, N and P2 electrodes of the diode. The PIN photodiodes 500 may be formed on the lower end of the rod 502, for example, by first polishing the lower end flat. As an alternative to the illustrated embodiment, the dual PIN diode may be formed by vacuum evaporating onto the end an initial film of P-type silicon which is crystallized by subsequent electron beam zone melting, as described in an article by F. Namba, et al., Electron and Laser Beam Symposium Proceedings 1965, pages 305–317. A layer of high resistance P-silicon ($10^{13}$/cm.$^3$ concentration) may next be epitaxially deposited. The surface of this latter layer may then be doped to form N silicon and complete the "PINIP" sandwich. The 1 micron diameter circular surface may then be electron beam machined or cut along a diameter to form two semicircular shaped PIN photodiodes. Electron beam machining of the perimeter might also be used as well as molecular beam depositing of ohmic connections if necessary.

The resulting two photodiodes are then back-biased, as in the previous embodiment, for example, and equal amplitude signals are derived from both when the photodiode is accurately centered on the recording track. However, any tendency for the lower end of the rod 502 to drift away from the track would cause an unbalance in the signals from the photodiodes, so that the servo system described previously may be used to maintain the pick-up centered on the track.

As shown in FIG. 10, the summed output of the differential amplifier 100 is provided for video reproduction purposes. This signal output, for example, may be processed by the video signal electronics system shown in block form in FIG. 17. The system includes a preamplifier 600 which is coupled to a clipper/limiter 602. The clipper/limiter 602 is, in turn, coupled to a demodulator 604 whose output is applied to a video amplifier 606. The output from the video amplifier 606 is applied to a process amplifier 608 which is controlled by a restoration network 610, the latter network responding to the video input. The resulting output from the amplifier 608 may be used to reproduce the picture intelligence by any appropriate display means.

The output from the photomultiplier itself is of the order of 2.4 microamps peak over a bandwidth of 0–10 $\mu$Hz. with a nominal signal/noise ratio of 60 db. To maintain this bandwidth without loss of signal/noise ratio, it is necessary to design the input circuits of the differential amplifier 100 of FIG. 10 carefully. The gain in the differential amplifier, followed by the video preampilfier 600 of FIG. 17 should permit some 60 db of clipping, this being achieved, for example, by the clipper/limiter 602. The video signal recorded on the disc 10 is preferably in the form of a frequency modulated carrier. This carrier is demodulated, for example, in the demodulator 604 and the resulting video signal is amplified in the video amplifier 606.

It is preferable that the demodulator 604 be of the solid state delay line type, such as included in present-day Ampex products of the VR1000 series. Such a solid state delay line demodulator is designated, for example, by the block diagram of FIG. 18. The demodulator includes an amplifier 700 whose output is passed through a 0.05 microsecond delay line 702 to an adder 704, in which it is compared with the output from the amplifier 700 as passed through an adjustable delay line 706. The resulting output from the adder 704 is passed to a full wave rectifier 710. The resulting output from the rectifier is passed through a low pass filter 720 to the video amplifier 606 of FIG. 17.

While particular embodiments of the invention have been shown and described, modifications may be made. It is intended in the following claims to cover the modifications which come within the scope of the invention.

What is claimed is:

1. A system for reproducing signals recorded on a recording medium, said system including: radiation-electric transducer means; optical fiber means for translating signals from said recording medium to said radiation-electric transducer means and having an end free to move in at least one direction; servo-controlled transducer means coupled to said optical fiber means for controlling the position of said end thereof; and a servo system electrically coupled to said radiation-electric transducer means and to said servo-controlled transducer means and responsive to signals from said radiation-electric transducer means for applying servo control signals to said servo controlled transducer means.

2. The system defined in claim 1 in which said radiation-electric transducer means is a photo-electric transducer; and in which said optical fiber means is a light conductor comprising a pair of optical fiber elements mounted in side-by-side relationship to form a pick-up member for translating light signals from said recording medium to said photo-electric transducer.

3. The system defined in claim 2 in which said photoelectric transducer includes a pair of independent sections responding respectively to light signals from respective ones of said optical fiber elements to produce first and second electrical output signals in response thereto; and in which said servo control system includes differential means for producing a control signal representative of the difference between said first and second electrical output signals and for applying said control signal to said servo-controlled transducer means.

4. The system defined in claim 1 and which includes a magnetic pliant reed member affixed to said optical fiber means for supporting the same, and in which said servo-controlled transducer means includes a coil surrounding said elongated magnetic member and said light conductor means.

5. The system defined in claim 4 and which includes at least one permanent magnet positioned adjacent said last named coil.

6. A pick-up head for use in conjunction with a medium having signals optically recorded thereon, said pick-up head including: a housing; photoelectric transducer means mounted in said housing; a pair of flexible optical fibers mounted in side-by-side relationship in said housing to form a flexible pick-up member for translating light signals to said photoelectric transducer means and having a freely movable end; servo controlled electromechanical transducer means coupled to said freely movable end of said pick-up member for controlling the position of said freely movable end in response to electrical signals applied thereto; and a servo system electrically coupled to said photoelectric transducer means and to said electromechanical transducer means and responsive to electric signals from said photoelectric transducer means for applying servo control signals to said electromechanical transducer means.

7. The pick-up head defined in claim 6 and which includes first electromechanical transducer means for controlling the position of said freely movable end along a first axis in response to servo control applied thereto, and second electromechanical transducer means mounted in said housing for controlling the position of said freely movable end along a second axis transversing said first axis in response to servo control electrical signals applied thereto.

References Cited

UNITED STATES PATENTS

| | | | |
|---|---|---|---|
| 2,838,683 | 6/1958 | Munro | 250—227 |
| 3,112,360 | 11/1963 | Gregg | 178—5.4 |
| 3,381,086 | 4/1968 | Moss et al. | 179—100.3 X |

FOREIGN PATENTS 720,963  11/1965  Canada.

BERNARD KONICK, Primary Examiner

R. F. CARDILLO, Jr., Assistant Examiner

U.S. Cl. X.R.

178—6.7